Feb. 19, 1924.

A. F. JENKINS

PRESSURE TRANSLATING DEVICE

Filed Dec. 4, 1920     3 Sheets-Sheet 1

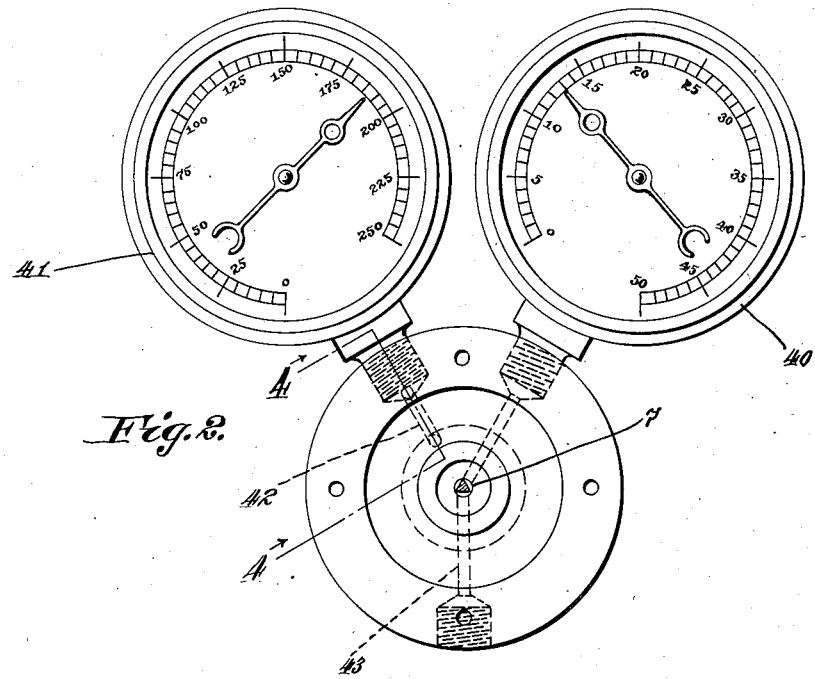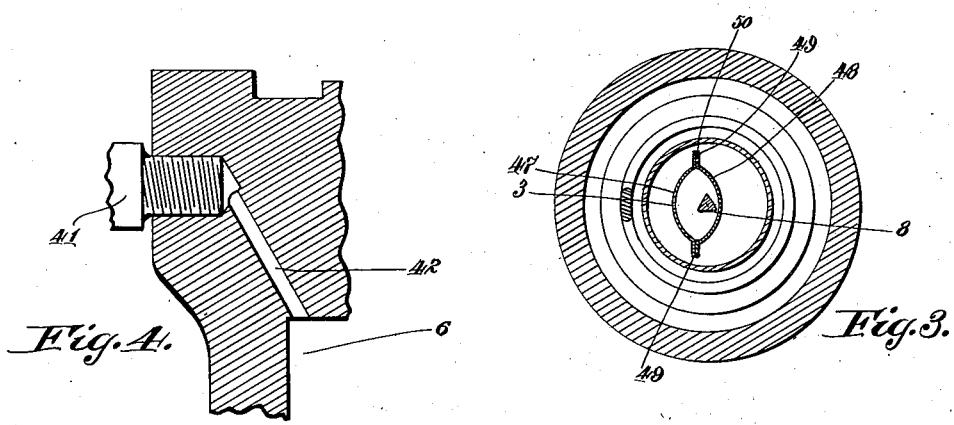

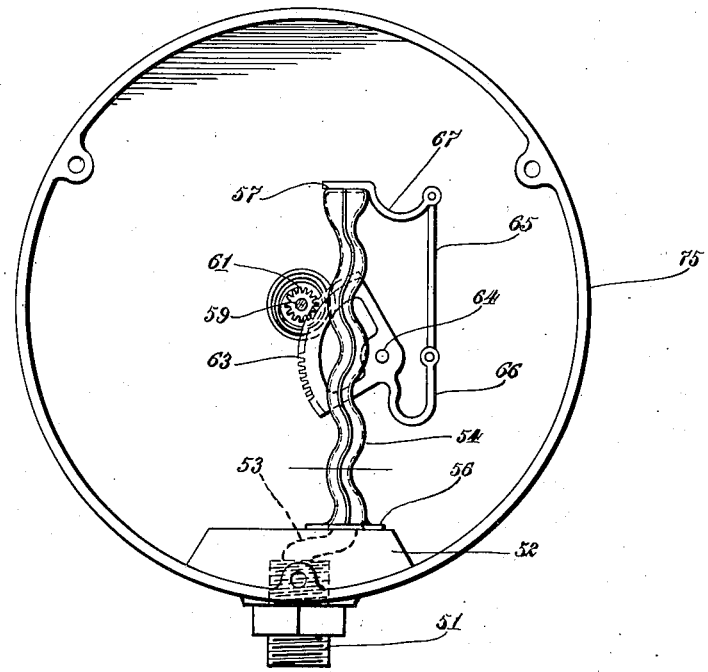
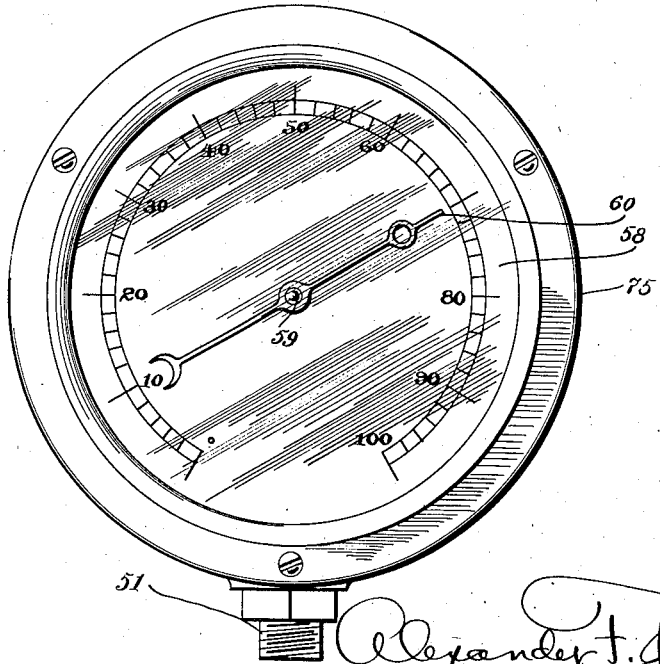

Patented Feb. 19, 1924.

1,484,394

UNITED STATES PATENT OFFICE.

ALEXANDER FREDERICK JENKINS, OF BALTIMORE, MARYLAND.

PRESSURE-TRANSLATING DEVICE.

Application filed December 4, 1920. Serial No. 428,413.

*To all whom it may concern:*

Be it known that I, ALEXANDER FREDERICK JENKINS, a citizen of the United States of America, residing in the city of Baltimore, State of Maryland, have invented certain new and useful Improvements in Pressure-Translating Devices, of which the following is a specification.

Pressure gauges, regulators and the like which are dependent for their operation upon the change of contour of a curved tube, due to change of the fluid pressure are well known, the curved tube being known as the Bourdon tube. The accordion or bellows type of gauge and regulator is also well known.

The present invention relates to a new actuating principle or more particularly to a new type of fluid pressure translating device which is capable of convenient and efficient arrangement in connection with a pressure regulator or pressure gauge or other similar device; which is capable of being produced at an exceedingly small cost and when embodied in the finished form as a pressure gauge or regulator admits of exceedingly compact arrangement and gives increased efficiency and uniformity of operation.

The invention also relates to the details and features of the apparatus. More specifically described, the translating device consists of an elongated tube which is formed or bent in the form of a series of short reverse curves or changes of direction as distinguished from an ordinary corrugated cylinder or bellows.

As the contour of the curve changes with the variation of internal pressure or the variation of the relation between internal and external pressure, the length of the tube is likewise changed. This variation of length is utilized to actuate a pressure regulating valve or similar device or a pressure indicator as the case may be.

In the preferred form, particularly as applied to a pressure regulator, the translating device is in a general way straight, that is, the tangents of the peaks of the curves are in alignment and the internal peaks are spaced apart sufficiently to permit a straight valve rod or other actuating rod to be passed through the tube, or changes in length due to changes of pressure applied to the tube may be utilized to indicate or regulate pressure in any preferred manner.

An important advantage of the translating unit is that it can be produced in quantities rapidly and at exceedingly small cost, as it consists merely of a section of tubing which can be easily rolled or formed in a series of reverse curves or waves or angles as already pointed out and as illustrated in the drawings.

In the accompanying drawings, I have shown a pressure gauge and also a pressure regulator constructed in accordance with my invention, the same being for the purpose of illustrating the application of my invention.

In the drawings:

Figure 2 is a plan view of the bottom section of the regulator, the top being removed.

Figure 3 is a section on the line 3—3 in Figure 1.

Figure 4 is a section on the line 4—4 in Figure 2.

Figure 5 is an elevation showing a pressure gauge with the pressure translating unit exposed, the dial being removed.

Figure 6 shows a pressure gauge with the dial in place.

Figure 1:
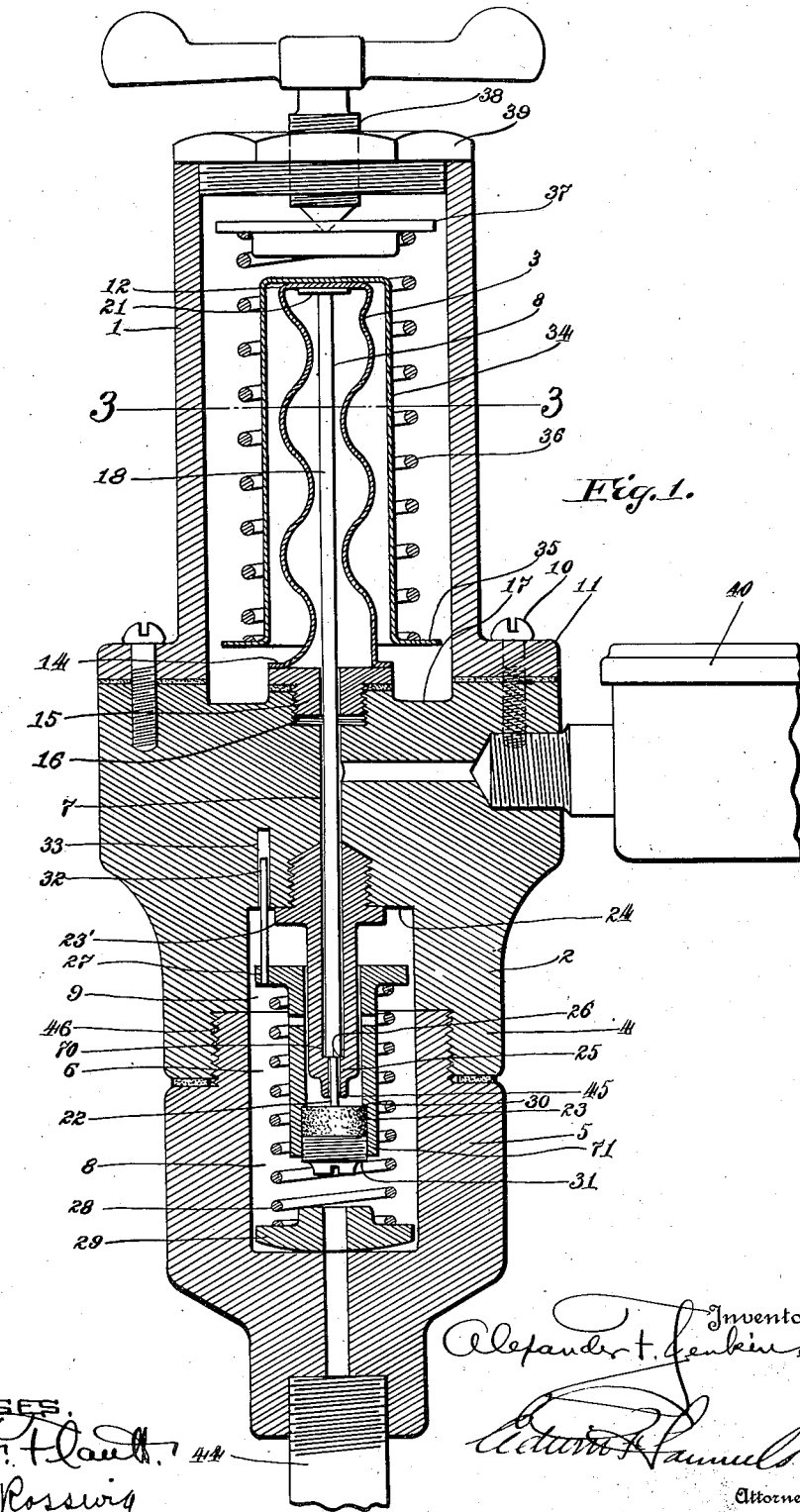
Figure 1 illustrates a pressure regulator, the figure being a section taken on the vertical axis.

Referring to the drawings by numerals:

The structure shown consists of upper and lower frame or body sections, 1 and 2, respectively, the upper member, 1, being hollow, cylindrical forming a regulating chamber, containing the regulating or translating member, 3, in the form of a reverse curved tubular member and the lower member, 2, which is for convenience, formed in two parts, 4, 5, including a pressure chamber, 6, it being understood that the terms "upper" and "lower", etc., are used for convenience and not as implying that the apparatus necessarily occupies any particular position relatively to the earth. The chambers 1 and 6, preferably are in alignment and are connected by a passage, 7. The chamber, 6, in the form shown, is formed of two registering recesses, 8, 9, in the cooperating parts, 4, 5, composing the lower section, 2. The two sections, 1, and 2, are conveniently joined by suitable fastenings as screws, 10, engaging flanges, 11, at the bottom of the upper or regulating section and seated in the lower section 2, so that the bottom wall, 17, of the regulating chamber is formed in the lower section, 2. The regulating or translating member, 3, in the form of the invention shown is closed at the top at 12, and open at the bottom, the open end of the tube in the form shown being flanged at 14, and the flanges being secured to a plug, 15, which is threaded to engage threads in a threaded opening, 16, in the bottom wall, 17, of the regulating chamber. The plug is centrally apertured in alignment with the passage, 7, and the valve stem, 18, which extends through the reverse curved tube 3, which is the regulating or translating member, abuts against a disk, 21, which bears against the top wall, 12, of the translating member. This valve stem extends down through the opening in the plug, 15, through the passage, 7, connecting the pressure regulating chamber, 1, and the high pressure chamber, 9, and engages with its lower end, 22, a valve disk, 23, in the pressure chamber.

In the form of the invention shown there is a plug, 23' threaded upward into the top wall, 24, of the pressure chamber, the free end extending downward into the pressure chamber, the plug being concentric with and apertured in alignment with the passage, 7. The aperture, 70, in the plug, is reduced at 25, forming a shoulder, 26, and the valve stem is correspondingly shouldered and the shoulders co-operate, determining the advanced position of the valve stem.

In the form of the invention shown, the valve disk, 23, is mounted in a carrier, 71, in the form of a cylinder which encloses and slides on the plug, 23,' which acts as a guide. The carrier is flanged at its upper end at 27 and controlled by a spring, 28, which encircles the carrier, bearing against the flange, 27, at one end and against a suitable abutment, 29, on the bottom of the pressure chamber, shown in the form of a button, which is free to rock relatively to the wall of the chamber. The valve disk 23, is seated in the carrier, 71, against a shoulder, 30, and held by a screw plug, 31. The carrier, as shown, is provided with a guiding pin, 32, seated in a guide pin opening or socket, 33.

Referring to the regulating chamber, the regulating or pressure translating member, 3, as shown, is enclosed within a cylindrical cap, 34, having a flange, 35, at its lower or open end and the cap is encircled by a spiral spring, 36, which bears on the flange, 35, and at its opposite end against a button or disk, 37, which is suitably flanged to position the spring and which in turn rests upon a screw stud, 38, threaded in a screw plug or cap, 39, which closes the upper end of the regulating chamber, 2. The screw stud is for purposes of adjustment as to the tension of the spring and hence as to the critical pressure or pressure of regulation.

In Figure 2, I have shown two pressure gauges, 40, and 41, the first for the purpose of indicating the regulated pressure, the same being connected to the passage, 7, and the second gage, 41, for indicating high or supply pressure. This is connected in the form of the invention shown to the high pressure chamber, 6, by passage, 42. There is also a delivery passage, 43, leading the fluid gas or liquid at regulated pressure to the point of consumption. This passage, 43, is most conveniently connected to the passage, 7. A high pressure or supply pipe, 44, is shown leading to the high pressure chamber, 6, see Figure 1.

In the operation of the regulator, the fluid, the pressure of which is to be regulated, is led to the high pressure chamber by way of the aforesaid supply pipe, 44. Assuming that the delivery pressure is below normal, the valve disk, 23, is separated from the valve seat, 45, by an appreciable interval as indicated in Figure 1, and the gas enters the passages, 7, about the valve rod, 8, which is preferably of angular cross section to permit the free passage of the gas without undesirable play of the valve stem in the passage.

The entrance of fluid through passage, 7, from the high pressure chamber or supply causes the building up of the pressure to be regulated. In the apparatus, as shown, the regulated pressure acts on the inside of the translating or regulating member, 3, and as the pressure builds up, this tubular member tends to straighten and therefore to lengthen withdrawing the valve stem, 8, and permitting the valve disk, 23, actuated by the spring, 28, to approach its seat. At the critical pressure or pressure of regulation, the valve disk is seated, the regulating operation being continued and repeated in accordance with the well known principles of pressure regulation.

In the apparatus shown, adjustment of the pressure of regulation is effected by means of the opposed springs, 36, and 28, the tension of the spring, 36, being changed by means of the screw adjustment or screw stud, 38, which change of adjustment has a corresponding effect on the resultant action of the two springs and hence on the spring pressure applied to the valve disk, 23. In the apparatus shown, this resultant spring pressure, co-operates with the resiliency of the regulating or translating member, 3, to determine the temperature of regulation, which when gas under pressure is applied, as aforesaid, is indicated by the gauge, 40.

To assemble the regulator, the upper section, 1, the lower section, 2, the co-operating parts, 4, 5, composing the lower section, 2, being separated, the plug, 23', is seated in the top wall of the pressure chamber, the latter carrying the valve seat, 45, the stem, 8, which may be brazed or soldered to the inside of the top wall of the translating tube or member, 3, is passed through the passage, 7. The regulating or translating member, 3, is preferably permanently secured to the plug, 15, and this plug carrying said member is next seated in its socket in the bottom wall, 17, of the regulating chamber. The cup, 34, is then passed over the regulating member, 3, or it may be brazed or otherwise fastened thereto at the top end. Spring, 36, is seated on and about the cup resting against the bottom flange, 35, and the button, 37. Then the top member, 1, is placed with its flange, 11, on the top face of the lower section, the screws, 10, being inserted to hold it.

Referring now to the pressure chamber, 8, the telescopic carrier, 24, containing the the valve disk, 23, is passed over the plug, 23', the spring, 28, being duly seated thereon, bearing against flange 27 and the button, 29, and the parts, 4, and 5, are assembled by engaging the threads, 46, on the respective parts.

The advantages of the details thus described except in so far as they relate particularly to the use of the regulating or translating member, 3, are set forth in my co-pending application No. 428,414. The present application relates broadly, to the new type of regulating and translating member, which is capable of general application, and to the various combinations of this feature with the details herein set forth.

In Figure 3, which is a sectional view on line 3—3, Figure 1, I have illustrated a form of tube section which may be used to advantage in the construction of the regulating or pressure translating member. This consists of two strips of metal, 47, 48, curved or concaved transversely and having flanges, 49, along the longitudinal edges. These strips are crimped or waved or formed in reversed curves or in successive peaks and depressions as indicated in Figure 1, and the flanges are placed in registration and fastened as indicated at 50 forming a tube which will serve efficiently as a pressure translating member in accordance with my invention, i. e., a reverse curved tube or a tube having successive hills and valleys or peaks and depressions with the curves in registration as illustrated in Figure 1, so that the opposite sides or elements are preferably parallel or substantially parallel and the opposite peaks and depressions are at least for the purposes of the form of regulator illustrated, so spaced and formed as to provide for the admission of the valve stem.

The translating or pressure regulating member may also be made by bending a section of thin sheet metal tubing to the form already described, i. e., having successive peaks and depressions besides being substantially parallel and the general direction of the tube being preferably straight so that an actuating rod may be passed through the tube and be free to reciprocate. The invention, however, contemplates and includes apparatus in which the tube is connected from the outside to the moving members to be actuated, in response to variations of pressure.

Some of the advantages of this apparatus are cheapness and simplicity of construction, possibility of constructing exceedingly sensitive instruments without the use of excessively thin diaphragms and the like. This is due to the fact that the motion produced by a given change of pressure is dependent upon the length of the tube and may be increased to any extent desired by increasing the length of the tube, giving any degree of sensitiveness of the instrument which may be desired. Another advantage is the convenience of arrangement made possible by this type of regulating member, particularly because it provides a direct actuating thrust as distinguished from the action of the curved Bourdon tube. This is much easier to translate into a regulating or indicating motion, than is, the corresponding motion of any previously known pressure translating device of the tubular type.

In Figures 5 and 6, I have illustrated a pressure gauge embodying the pressure translating member of my invention. This includes a frame, 75, with a fluid pressure pipe, 51, seated at its end in a block, 52, secured to the frame on the inside and having a passage, 53, leading to the inner surface of the block. A pressure translating tube or member, 54, constructed in accordance with my invention as described and preferably provided with a flange, 56, at its lower end, the upper end, 57, being closed, is secured to the block with the opening at the lower end of the tube over and enclosing the opening or open end of the passage, 53. The gauge, frame, 75, is covered by a suitable dial, 58, and a pivot pin, 59, is journalled in the frame concentric with the dial, carrying a pointer or hand, 60, adapted to swing over the face of the dial, and a pinion, 61, preferably back of the dial. Gearing with the pinion, I have shown a toothed member, 63, which may be in the form of a segment or arc or otherwise. This in the form illustrated is pivoted at 64. This toothed member, 63, in the form shown, is connected in any suitable manner to the upper or moving end of the translating tube, 54. In the present instance, this connection is shown in the form of a link, 65, pivoted at one end to an arm, 66, extending backward from the toothed member, 63, and at the other end to a bracket or other suitable means, 67, secured to the upper or moving end, 57, of the translating tube, 54.

I have thus described the pressure translating member of my invention, which is capable of general application, and have described specifically and in detail a pressure regulator and a pressure gauge to which it may be applied and have also described this apparatus in detail, in order that the operation of the same and the manner of constructing it may be clearly understood; however, the specific terms herein are used descriptively rather than in a limiting sense, the scope of the invention being defined in the claims.

What I claim and desire to secure by Letters Patent, is:

1. A pressure translating device in the form of a tubular container having its opposite sides substantially parallel and formed in successive peaks and depressions of a depth less than half the diameter of the tube, means for applying a variable fluid pressure to said tube, changing the form and dimensions thereof, and means adapted to be actuated by said change of form and dimension.

2. A pressure translating device comprising a tube formed in a series of peaks and depressions, the opposite walls of the tube being so spaced and the peaks and depressions so formed as to admit a rod within the tube and permit the rod to be reciprocated in the direction of the length of the tube, a rod extending into said tube and actuated by the tube to move in response to the contraction and expansion of the tube, and means for applying a variable fluid pressure to the tube.

3. A pressure regulator comprising a pressure translating member consisting of an elongated member having its opposite sides parallel and formed in a series of alternate peaks and depressions of a depth less than half the diameter of the tube, means for leading fluid under pressure to the regulator, means for leading fluid at regulated pressure from the regulator, a connection between said means, means for applying the regulated pressure to the tube, means for supporting tube and means actuated by variations in the length of the tube, resulting from variations of the regulated pressure for varying the capacity of said connection.

4. A pressure regulator comprising a supply for fluid under pressure, a delivery for fluid at regulated pressure, a connection between said passages, a pressure translating member consisting of a tube formed in a series of alternate peaks and depressions, the opposite walls of the tube being so spaced and the peaks and depressions so formed as to permit a rod to be reciprocated in the direction of the length of the tube, a rod extending into said tube and actuated by the tube to reciprocate in response to the contraction and expansion of the tube length, a valve actuated by said rod to control the capacity of the connection between the supply and delivery.

5. A pressure regulator, consisting of a high pressure supply, a regulated pressure delivery, a connection between the supply and delivery, a pressure translating member, consisting of a tube formed in alternate peaks and depressions, means for applying the regulated pressure to one surface of said tube, means for supporting the tube, a valve rod extending through the tube and adapted to reciprocate therein, the rod being actuated by a portion of the tube at a point spaced from the support, a valve member controlling the connection between the supply and delivery, the rod being adapted to control the valve member in response to variations to the pressure being regulated.

6. A fluid pressure regulator having a high pressure chamber, a regulating chamber, a passage connecting said chambers, a valve seat, and a valve controlling said passage, a tube formed in a series of peaks and depressions and closed at one end, the tube being in the regulating chamber and having its other end secured to the wall of the chamber, enclosing the passage opening, a rod extending into said tube, engaging the closed end and extending into said passage and actuating the valve, a spring tending to keep the valve on its seat and means for leading the fluid under regulated pressure from the low pressure side of the valve.

7. A pressure translating tube having its opposite sides substantially parallel and formed in successive peaks and depressions of a depth less than half the diameter of the tube, the said tube consisting of two strips concaved transversely and crimped or waved to form said peaks and depressions and having a flange along each edge, the flanges of the respective strips being secured together.

8. A pressure translating device in the form of a tubular container having its opposite sides substantially parallel and formed in successive peaks and depressions, the said tubular container consisting of two strips of material extending longitudinally of the tube, the strips being concaved transversely and crimped or waved to form said peaks and depressions, and having corresponding longitudinal edge flanges, which flanges on the respective strips are secured together.

Signed by me at Baltimore, Maryland, this 1st day of December, 1920.

ALEXANDER FREDERICK JENKINS.

Witnesses:
A. W. CARR,
BERTHA SCHROETER.